US012756939B2

(12) United States Patent
Zhang et al.

(10) Patent No.: US 12,756,939 B2
(45) Date of Patent: Oct. 6, 2026

(54) AUTOMATIC CONTINUOUS FLASH LIGHTING FOR CLOSE RANGE IMAGE CAPTURE

(71) Applicant: Apple Inc., Cupertino, CA (US)

(72) Inventors: Bosheng Zhang, Sunnyvale, CA (US); Kurt S. Clark, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 82 days.

(21) Appl. No.: 18/898,959

(22) Filed: Sep. 27, 2024

(65) Prior Publication Data

US 2025/0113107 A1 Apr. 3, 2025

Related U.S. Application Data

(60) Provisional application No. 63/586,575, filed on Sep. 29, 2023.

(51) Int. Cl.

| | |
|---|---|
| ***H04N 23/74*** | (2023.01) |
| ***G06T 7/50*** | (2017.01) |
| ***H04N 23/71*** | (2023.01) |

(52) U.S. Cl.

CPC ............... *H04N 23/74* (2023.01); *G06T 7/50* (2017.01); *H04N 23/71* (2023.01)

(58) Field of Classification Search

CPC .......... H04N 23/74; H04N 23/71; G06T 7/50; H05B 47/11

See application file for complete search history.

(56) References Cited

U.S. PATENT DOCUMENTS

| | | | | |
|---|---|---|---|---|
| 6,927,799 | B2 * | 8/2005 | Tseng | H04N 23/74 348/E5.029 |
| 8,941,754 | B2 * | 1/2015 | Miyazaki | H04N 23/74 348/370 |
| 12,135,284 | B2 * | 11/2024 | Koga | G01N 33/0098 |

* cited by examiner

*Primary Examiner* — Ahmed A Berhan

(74) *Attorney, Agent, or Firm* — Blank Rome LLP

(57) ABSTRACT

Techniques are described that utilize continuous flash lighting, e.g., with automatic activation/deactivation and brightness control of a flash lighting element in an electronic image capturing device. Depth sensing, in combination with front and/or rear lux sensing, is performed at the device and used to evaluate the lighting on the object of interest being captured and/or the overall scene light levels. A lighting element (e.g., a single- or multi-channel flash element) may be controlled automatically based on the depth, front and rear lux sensing, or a combination thereof. The lighting element's intensity may be automatically adjusted in a smooth and gradual manner, e.g., utilizing ranges of acceptable lux values and/or non-linear lighting element activation functions.

20 Claims, 6 Drawing Sheets

AUTOMATIC CONTINUOUS FLASH LIGHTING FOR CLOSE RANGE IMAGE CAPTURE

TECHNICAL FIELD

This disclosure generally relates to the field of digital image processing. More particularly, but not by way of limitation, it relates to techniques for performing automatic and continuous flash lighting control schemes, especially for macro photography use cases.

BACKGROUND

The advent of mobile, multi-function electronic devices, such as smartphones and tablet devices, has resulted in a desire for small form factor cameras capable of generating high levels of image and video quality for integration into such mobile, multi-function devices. Over the years, these multi-function devices have gone from being single-camera devices to being multi-camera devices-gaining additional cameras (with steadily increasing resolutions, fields of view, frame rates, etc.) over time.

However, the lighting conditions for image capturing may vary dramatically. Also, the presence of the imaging device itself with respect to an object of interest being photographed can affect the lighting on the object, especially during extreme close-up or so-called "macro" photography situations, e.g., the image device casting a shadow that can adversely affect a desired image quality. Improvements in the ability to capture high contrast, detailed images in macro photography situations and/or low scene lighting conditions is desired.

Thus, it would be beneficial to have techniques that could allow electronic devices, e.g., mobile, multi-function electronic devices with camera(s) and lighting elements, to capture intelligently-lit images and video image steams, thereby allowing for the production of higher quality macro photography images, as well as higher quality images in low scene lighting conditions.

SUMMARY

Traditional flash photography uses pulsed lighting to light up a scene that is being captured. Typically, the pulsed flash only illuminates at the moment of capture, e.g., when a user activates a shutter button (and, optionally, based on additional scene lighting information gathered during a "pre-flash" phase). In this disclosure, techniques are described that utilize continuous flash lighting, e.g., with automatic activation/deactivation and brightness control. These techniques are especially applicable to close range (e.g., less than 0.5 m) image capturing, such as macro photography, where the image capture device may cast a shadow upon the scene/object the photographer is attempting to capture, resulting in the capture of darker and/or blurry images that lack crisp detail.

Thus, according to some techniques disclosed herein, image capturing techniques performed at the device, such as front lux sensing, depth sensing, and/or rear lux sensing, may be used to evaluate the lighting on the object of interest being captured and/or if the overall scene light levels are too low. According to some techniques disclosed herein, a lighting element (e.g., a single- or multi-channel flash element) may be turned on automatically when an object of interest is sufficiently close to the camera and when a sufficient amount of shadow is detected over the object of interest. In some embodiments, the lighting element's intensity may be adjusted in a smooth and gradual manner, e.g., utilizing ranges of acceptable lux values and/or non-linear lighting element activation functions.

As such, devices, methods, and non-transitory computer readable media are disclosed herein to perform automatic and continuous flash lighting control schemes. In one embodiment, an electronic device that includes a memory; a first image capture device; a first ambient light sensor (ALS) oriented in a first direction with respect to the electronic device; a second ALS oriented in a second direction with respect to the electronic device; and a first lighting element configured to emanate light in the first direction. The one or more processors operatively coupled to the memory and execute instructions causing the one or more processors to obtain a video image stream from the first image capture device, the video image stream being a first plurality of captured images of a scene; obtain, from the first ALS and concurrently with the capture of the first plurality of images, a first stream of lux estimates for the scene; obtain, from the second ALS and concurrently with the capture of the first plurality of images, a second stream of lux estimates for the scene; calculate a stream of lux differential values based on a comparison of corresponding estimates from the first stream of lux estimates and the second stream of lux estimates; obtain a stream of depth estimates, wherein the depth estimates represent an estimated depth of an object of interest appearing in at least one of the captured images of the scene; determine, based, at least in part, on the stream of lux differential values and the stream of depth estimates, to adjust an intensity of light emanating from the first lighting element.

According to some embodiments, the electronic device further comprises a display, wherein the display is configured to display an indicator representing a status of the first lighting element. According to some such embodiments, the display is oriented in the second direction with respect to the electronic device.

According to some embodiments, the electronic device further comprises a depth sensor, e.g., a Time-of-Flight sensor, a LiDAR sensor, etc., wherein the stream of depth estimates are determined based, at least in part, on output from the depth sensor.

According to some embodiments, the first direction and the second direction are opposite directions from one another with respect to the electronic device.

According to some embodiments, the first lighting element comprises a plurality of controllable channels. According to some such embodiments, each of the plurality of controllable channels may be configured to be controlled independently based, at least in part, on a corresponding target value or target range of values. According to other such embodiments, the one or more processors may be configured to: adjust an intensity of each of the plurality of controllable channels until a corresponding measured scene lux value for each channel is within a respective range of acceptable lux values for the channel.

According to some embodiments, the one or more processors may be configured to: activate the first lighting element when: (a) values in the stream of lux differential values meet a lux differential criterion; and (b) corresponding values in the stream of depth estimates meet a depth criterion. According to some such embodiments, the lux differential criterion comprises an estimate from the second stream of lux estimates being greater than the corresponding estimate from the first stream of lux estimates by more than a lux differential threshold amount. According to other such embodiments, the depth criterion comprises the estimated depth of the object of interest being less than a first depth threshold amount (and, optionally, greater than a second depth threshold amount).

According to some embodiments, the one or more processors may be configured to: deactivate the first lighting element when: (a) values in the stream of lux differential values do not meet a lux differential criterion; or (b) values in the stream of depth estimates do not meet a depth criterion.

According to some embodiments, the one or more processors may be configured to: adjust an intensity of light emanating from the first lighting element according to a predefined lighting element activation function, e.g., a non-linear curve, such as a curve constructed from one or more exponential functions.

According to some embodiments, the one or more processors may be configured to: activate the first lighting element when either the first stream of lux estimates or the second stream of lux estimates is below a predetermined threshold value.

According to some embodiments, the one or more processors may be configured to: adjust an intensity of light emanating from the first lighting element until an estimated lux value from the second stream of lux estimates is within a range of acceptable scene lux values.

According to some embodiments, the one or more processors may be configured to: receive an indication from a user of the electronic device to generate and store an image of the scene (e.g., via the activation of a "virtual" or physical shutter button of the electronic device); and, in response to the received indication: (a) generate an image of the scene; and (b) store the generated image of the scene in the memory.

In another aspect, embodiments are directed to a digital image processing method that includes obtaining a video image stream from a first image capture device of an electronic device. The video image stream including a first plurality of captured images of a scene. The method includes obtaining concurrently with the capture of the first plurality of images, a first stream of lux estimates for the scene and a second stream of lux estimates for the scene. The method calculates a stream of lux differential values based on a comparison of corresponding estimates from the first stream of lux estimates and the second stream of lux estimates and determines, based at least in part on the stream of lux differential values and the stream of depth estimates, to adjust an intensity of light emanating from a first lighting element in communication with the electronic device. In some embodiments, the first stream of lux estimates is determined from the first plurality of images.

In another aspect, embodiments are directed to a non-transitory computer readable medium including computer readable instructions executable by one or more processors to obtain a video image stream from a first image capture device of an electronic device. The video image stream includes a first plurality of captured images of a scene. The instructions cause the processors to obtain concurrently with the capture of the first plurality of images, a first stream of lux estimates for the scene and a stream of depth estimates. The stream of depth estimates represent an estimated depth of an object of interest appearing in at least one of the captured images of the scene; determine, based, at least in part, on the first stream of lux estimates and the stream of depth estimates, to adjust an intensity of light emanating from a first lighting element of the electronic device.

Various non-transitory computer readable media embodiments are disclosed herein. Such computer readable media are readable by one or more processors. Instructions may be stored on the computer readable media for causing the one or more processors to perform any of the techniques disclosed herein. Various methods for performing the digital image processing techniques summarized above are also disclosed herein.

DETAILED DESCRIPTION

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

Introduction and Problem Background

In traditional photography operations, so-called "macro" photography is typically performed by cameras with a magnification ratio of 1:1 and a minimum focusing distance of 30 centimeters or less. However, many users now desire high quality digital photography from their mobile electronic devices, including macro photography and image capture in low scene lighting conditions. For example, visual intelligence use cases, such as QR code scanning under low light conditions without disturbing others or supplying just enough light for text understanding or other vision tasks may be desired.

Because of the orientation of electronic devices during typical macro photography capture scenarios, the electronic device itself can influence the brightness of the captured image, for example by casting a shadow on an object of interest that is being photographed. Such scenarios may result in a blurry image, or insufficient lighting to capture details in the image.

Thus, as will now be explained in greater detail, the inventors of the present disclosure have developed new techniques to intelligently (e.g., automatically and/or continuously) activate and/or adjust a lighting element of an electronic device (e.g., a flash element) to improve scene lighting conditions and capture higher quality digital images in a variety of image capture scenarios, such as macro photography and low scene lighting conditions for photography and/or visual intelligence.

Figure 1A:
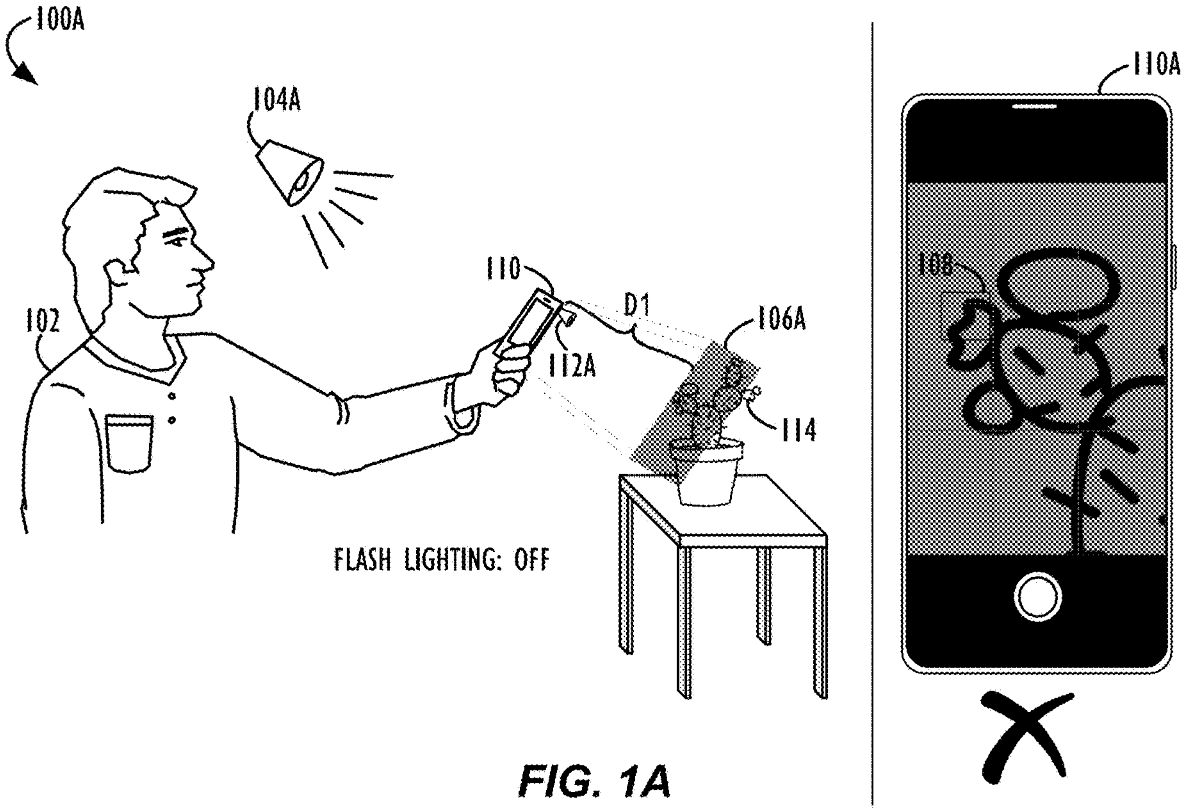
FIGS. 1A-1D illustrate exemplary scenes for performing automatic and continuous flash lighting operations, according to one or mor embodiments.

Exemplary Image Capture Scenarios for Automatic and Continuous Flash Lighting Operations Turning now to FIG. 1A, an exemplary scene 100A is illustrated, according to one or more embodiments. In scene 100A, a user 102 is engaged in an attempted "macro" photography operation, wherein an object of interest (e.g., the potted plant 114) is within a relatively close distance, D1 (e.g., less than 10 cm, less than 30 cm, etc.), from the electronic device 110 of the user 102. In this example, electronic device 110 comprises a "rear-facing" image capture device, e.g., a digital video camera. The electronic device 110 also possesses a rear-facing lighting element, e.g., flash 112A, which is shown as being deactivated in scene 100A, for reasons which will now be explained in further detail.

The examples herein are illustrated using an exemplary mobile device; however, embodiments are not limited as such. Image capturing devices are used in a wide range of electronic devices. For example, security/monitoring devices, wearable devices-such as watches, glasses, etc. Embodiments may also include an image capture device coupled to a lighting element, such light sources may be internal or external to the image capture device, for example a small flashlight installed in or attached to a watch or other wearable device.

First, note that the object of interest 114 is illuminated by the light 104A in the scene 100A. As a result of the position of the light 104A relative to the position of the object of interest 114, the electronic device 110 casts a shadow 106A on the object of interest 114. With the flash 112A deactivated, this can result in an overall darker image as shown on the electronic device 110's display 110A. This can also result in a loss of detail in a specific area of focus 108, which can even affect auto-focusing procedures.

Figure 1B:
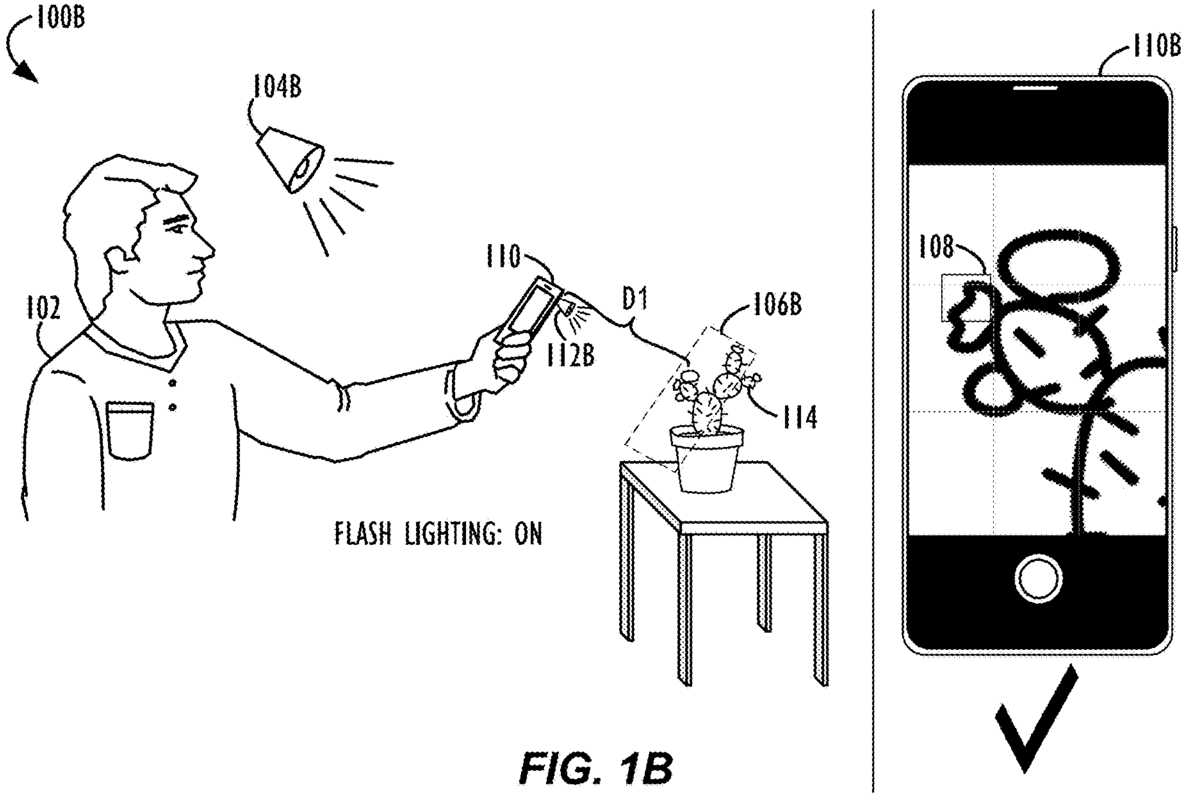

Turning next to FIG. 1B, another exemplary scene 100B for performing automatic and continuous flash lighting operations is illustrated, according to one or more embodiments. In exemplary scene 100B, the flash 112B is controlled to illuminate the object of interest 114 to help remove the effect of shadows 106B as a result of the presence of the device 110. The intensity of the flash 112B is controlled based on an ambient lux level detected in the rear facing direction of the device 110 (toward the object of interest 114); an ambient lux level detected in the front facing direction of the device 110 (towards the light 104B); and the distance D1 from the device 110 to the objection of interest 114. As a result of flash 112B being activated in an intelligent and automated fashion, the image on the display 110B appears brighter, with better image quality in a specific area of focus 108.

Figure 1C:
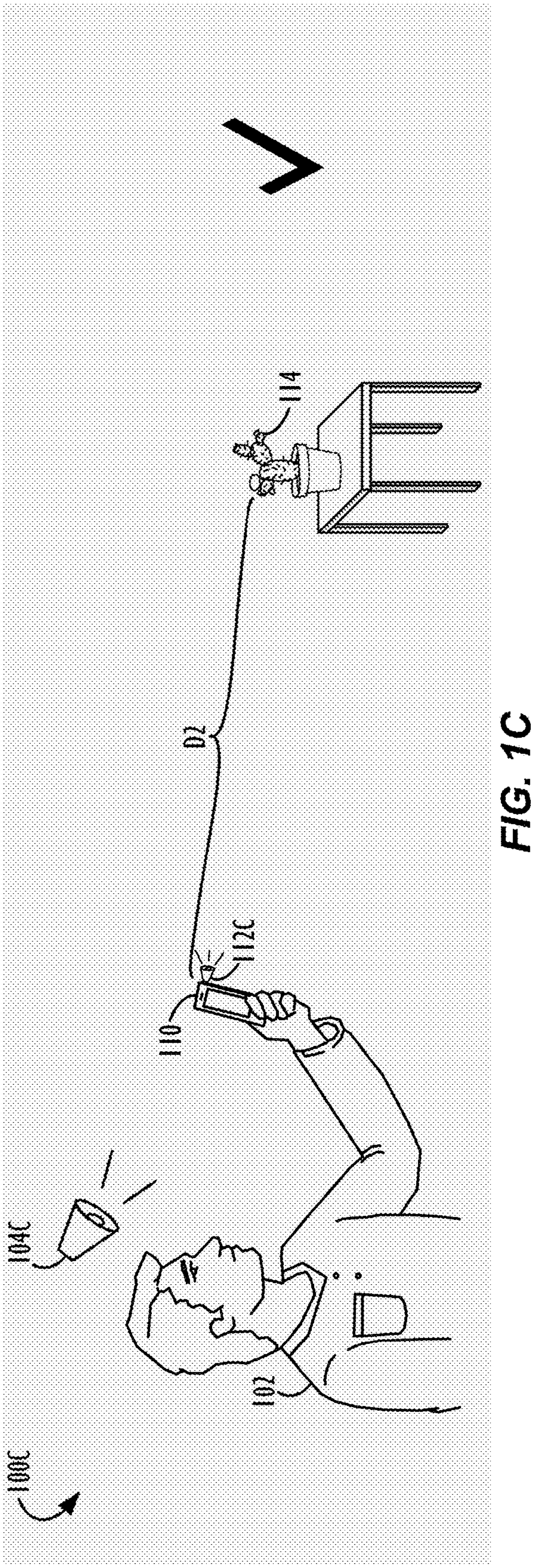

Turning next to FIG. 1C, an exemplary scene 100C for performing automatic and continuous flash lighting operations is illustrated, according to one or more embodiments. In the scene 100C, the light source 104C is dimmer and the distance D2 between the device 110 and the object of interest 114 is increased. Accordingly, the intensity of the flash 112C may be lower than that of scene 100B, e.g., based on the lux detected in the rear facing direction of the device 110 (toward the object of interest 114); the lux detected in the front facing direction of the device 110 (towards the light 104C); and the distance D2 from the device 110 to the objection of interest 114. In the exemplary scene 100C, it may be determined, e.g., based on the estimated distance D2, that activating the flash 112C, at least to some extent, could have a beneficial effect on images captured of scene 100C. In other words, D2 may represent a distance where it is determined that flash 112C can still have an effect on the amount of light cast upon object of interest 114 in the scene 100C.

Figure 1D:
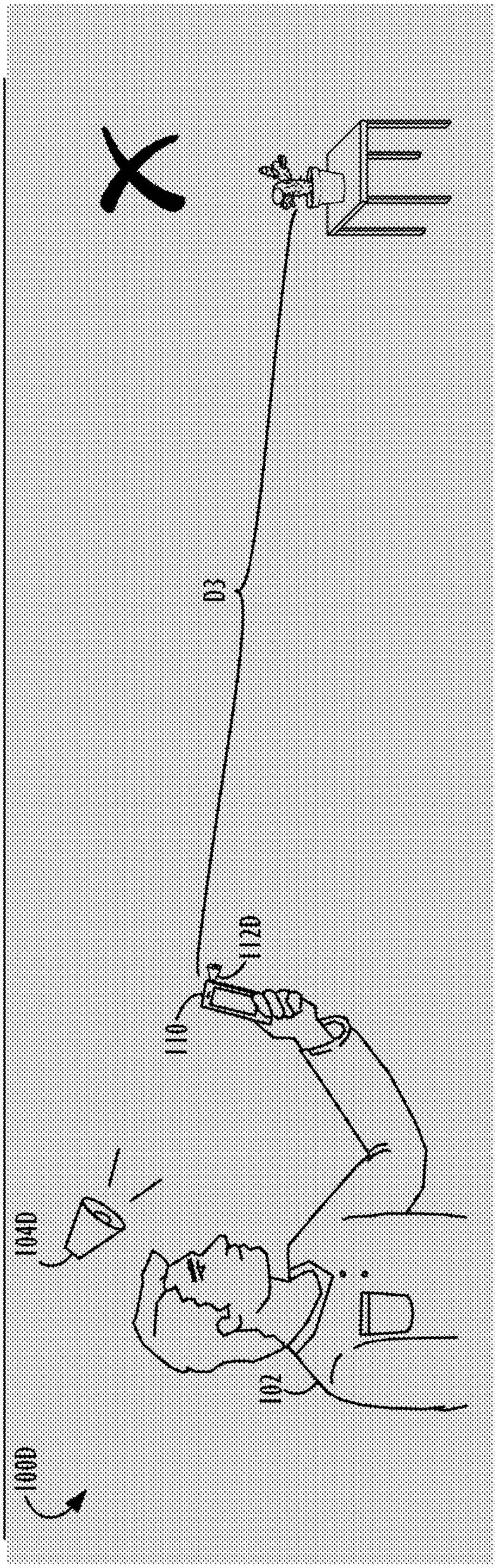

Turning next to FIG. 1D, an exemplary scene 100D for performing automatic and continuous flash lighting operations is illustrated, according to one or more embodiments. Scene 100D illustrates that the distance D3 between the device 110 and the object of interest 114 may be increased to a point where bright illumination from the flash 112D is undesirable, e.g., a distance at which flash 112D no longer has any effect on the amount of light cast upon object of interest 114 in the scene 100D. Given a lower light level emitted from the light 104D, and the greater distance D3, a bright illumination from the flash 112D may not significantly improve the acquired images, and such illuminations can also disturb the environment and/or other people therein (e.g., from flashes in a darker environment). One of ordinary skill will appreciate that, in general, the greater the distance between a device 110 and an object of interest 114 (and the higher the current scene lux), the greater the illumination from the flash 112 that will be needed to have a potentially beneficial impact on the object of interest 114 that is being captured; however, scene 110D illustrates that there is a limit to such distances at which the flash may be intelligently activated, e.g., additionally as a function of the scene light levels, in accordance with embodiments disclosed herein.

Multi-Channel Independently Controllable Flash Lighting Element

Figure 2:
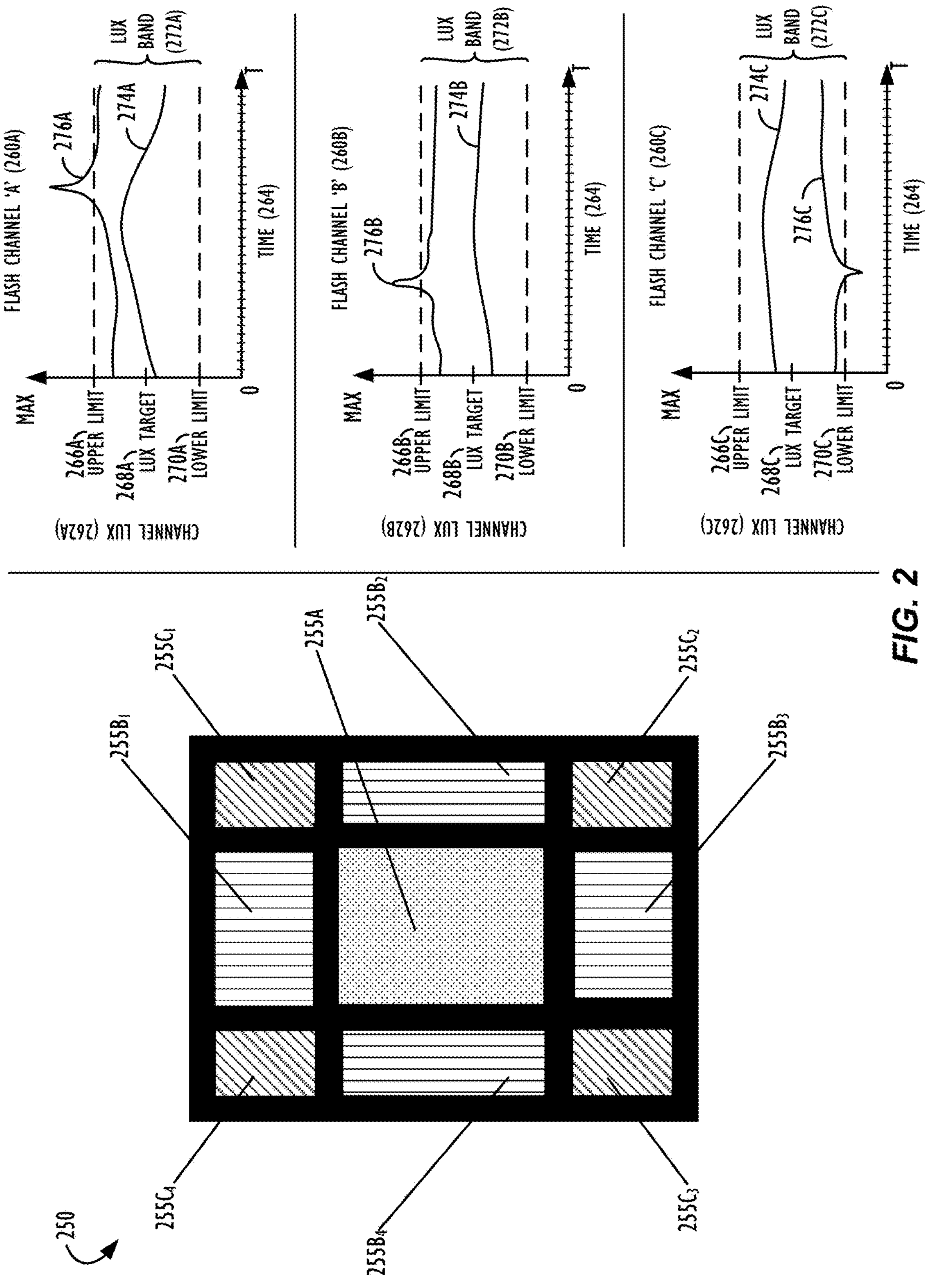
FIG. 2 illustrates an exemplary multi-channel, independently controllable flash lighting element, according to one or more embodiments.

Embodiments may be further enhanced through the utilization of a multi-channel flash lighting element capable of independent control of different areas of illumination of the flash. Turning now to FIG. 2, an exemplary multi-channel, independently controllable flash lighting element 250 is illustrated, according to one or more embodiments. The flash lighting element 250 includes nine areas of illumination. A central area 255A is in the center of the flash lighting element 250. The sides of the flash lighting element 250 include four side areas of illumination 255$B_1$, 255$B_2$, 255$B_3$, 255$B_4$; and the corners include four corner areas of illumination 255$C_1$, 255$C_2$, 255$C_3$, 255$C_4$.

In the example of FIG. 2, the flash lighting element 250 includes three independently controllable flash channels, i.e.: flash channel A, flash channel B, and flash channel C. As illustrated in FIG. 2: flash channel A controls the illumination of the central area 255A; flash channel B controls the illumination of the side areas 255$B_1$, 255$B_2$, 255$B_3$, 255$B_4$; and flash channel C controls the illumination of the corner 255$C_1$, 255$C_2$, 255$C_3$, 255$C_4$.

Graph 260A represents an exemplary lux graph for the elements in the central area 255A flash channel A, described above. Embodiments herein may establish a desirable lux band 272A and/or a lux target 268A. The desirable lux band 272A includes an upper limit 266A and a lower limit 270A of the detected channel lux 262A (e.g., the amount of light measured in the region of the captured scene that can be influenced by flash channel A). In embodiments, the upper limit 266A and lower limit 270A may be established based on the light levels, as well as the distance to an object. The lux values 274A and 276A as a function of time illustrate exemplary lux values that may be established based on the measured lux for flash channel A. The exemplary lux values 274A remain within the lux band 272A for the duration of the image capturing, thus representing an example of a captured scene wherein the intensity with which the flash channel A is independently controlled does not need to be adjusted during the duration shown on time axis 264. The exemplary lux values 276A, by contrast, illustrate an example of a captured scene, wherein the measured lux for flash channel A can drift (based on the lux inputs and distances) to an area outside of the lux band 272A, thus requiring correction, e.g., a smooth reduction in the intensity of light produced by flash channel A and central area 255A, in this example, until values 274A again return to the lux band 272A of acceptable values for flash channel A.

Analogously, graph 260B represents an exemplary lux graph for the elements in flash channel B, described above. The flash channel B is associated with the side areas 255$B_1$, 255$B_2$, 255$B_3$, 255$B_4$ of the flash lighting element 250. Similar to flash channel A 260A, the lux values 274B and 276B as a function of time illustrate exemplary lux values that may be established based on the measured lux for flash channel B. The exemplary lux values 274B remain within the lux band 272B for the duration of the image capturing, thus representing an example of a captured scene wherein the intensity with which the flash channel B is independently controlled does not need to be adjusted during the duration shown on time axis 264. The exemplary lux values 276B, by contrast, illustrate an example of a captured scene, wherein the measured lux for flash channel B can drift (based on the lux inputs and distances) to an area outside of the lux band 272B, thus requiring correction, e.g., a smooth reduction in the intensity of light produced by flash channel B and one or more of side areas 255$B_1$, 255$B_2$, 255$B_3$, and/or 255$B_4$, i.e., until values 274B again return to the lux band 272B of acceptable values for flash channel B.

Finally, graph 260C represents an exemplary lux graph for the elements in flash channel C, described above. The flash channel C is associated with the corner areas 255$C_1$, 255$C_2$, 255$C_3$, 255$C_4$ of the flash lighting element 250. Similar to flash channels A and B, the lux values 274C and 276C as a function of time illustrate exemplary lux values that may be established based on the measured lux for flash channel C. The exemplary lux values 274C remain within the lux band 272C for the duration of the image capturing, thus representing an example of a captured scene wherein the intensity with which the flash channel C is independently controlled does not need to be adjusted during the duration shown on time axis 264. The exemplary lux values 276C, by contrast, illustrate an example of a captured scene, wherein the measured lux for flash channel C can drift (based on the lux inputs and distances) to an area outside of the lux band 272C, thus requiring correction, e.g., the smooth increase in the intensity of light produced by flash channel C and one or more of corner areas 255$C_1$, 255$C_2$, 255$C_3$, and/or 255$C_4$, i.e., until values 274C again return to the lux band 272C of acceptable values for flash channel C.

The example flash lighting element 250 in FIG. 2 is arranged with three channels: a central area, side areas, and corner areas; however, one of ordinary skill in the art will appreciate that embodiments are limited as such. For example, each area shown on the flash lighting element 250 may be independently controlled, with similar flash channel considerations, such as described above with reference to exemplary graphs 260A/260B/260C. In addition, rather than central, side, and corner channels, the channels may be grouped in horizontal or vertical rows. Also, the relative sizes of the different areas may vary in accordance with embodiments herein. Further, the amount of granularity and control over a flash lighting element that is provided to the control firmware for a given camera device may vary from implementation to implementation, e.g., based on the flexibility and capabilities of the hardware that is available.

Further, embodiments of the multi-channel flash lighting element capable of independent control of different areas of illumination of the flash may be used to eliminate hots spots created by the flash. For example, surfaces that reflect a portion of the light in a scene may reflect the light from the flash back to the image capturing device, creating a hot spot. The multi-channel flash light element has the capability of selectively dimming areas of the flash, such as the central area, to help alleviate hot spots from reflective surfaces.

Automatic Continuous Flash Lighting Algorithm Example

Figure 3:
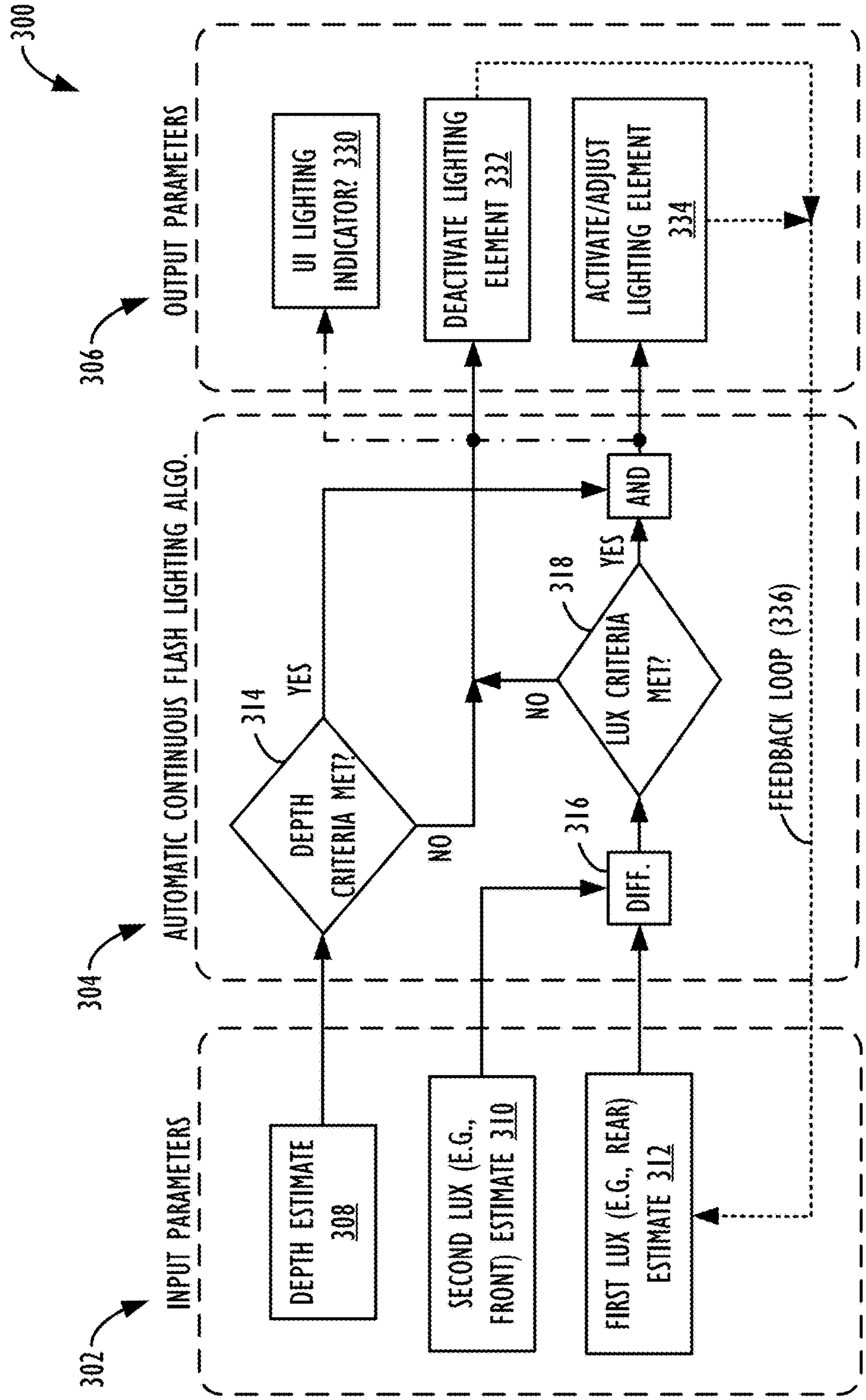
FIG. 3 illustrates an example of an algorithm for performing automatic and continuous lighting operations, according to one or more embodiments.

Turning now to FIG. 3, an example 300 of an algorithm and various parameters for performing automatic and continuous lighting is shown, according to one or more embodiments. The input parameters 302 include a depth estimate 308, a second lux estimate 310, and a first lux estimate 312. In this example, the first lux estimate 312 is associated with a measured lux in the rear direction, and the second lux estimate 310 is associated with a measurement in an opposite, forward direction.

The automatic continuous flash lighting algorithm 304 determines if a depth criteria 314 has been met, e.g., based on the depth estimate 308. The automatic continuous flash lighting algorithm 304 also determines a difference 316 between the first lux estimate 312 and the second lux estimate 310, which, difference, as described above, may be used as a proxy or estimate for the amount of shadow that is likely being cast on an object of interest that a user is attempting to photograph in a macro photography situation.

The automatic continuous flash lighting algorithm 304 determines if a lux criteria 318 has been met. The lux criteria 318 may be based on the difference 316 between the first lux estimate 312 and the second lux estimate 310. For example, in some cases, the lux criteria may not be met unless or until the difference between the first lux estimate and the second lux estimate at a given moment in time is greater than a lux differential criterion. The lux criteria may also be based on the measured level of the first lux estimate 312 and/or the second lux estimate 310. For example, in some cases, the lux criteria may be met if the first lux estimate (or second lux estimate) is below a given lux threshold.

Based on the lux criteria 318 and the depth criteria 314 being met, the lighting element may be activated or adjusted 334 as an output parameter 306 of the continuous flash lighting algorithm. Under certain criteria, e.g., if either one or both of lux criteria 318 or depth criteria 314 are not currently satisfied, the lighting element may be deactivated 332. In some embodiments, a User Interface (UI) lighting indicator 330 may be displayed to let the user know continuous adjusting of the lighting element is taking place.

Based on the adjusting/activating 334 or deactivating 332 the lighting element (or one or more independently controllable channels of the lighting element), the lighting levels in the scene may change, which changes would then be reflected in the updated first lux estimate 312 and/or the second lux estimate 310, as represented by dashed line feedback loop 336. The feedback loop 336 allows for the automatic and continuous adjustment of the flash lighting element in example 300 to be able to intelligently adapt to lighting conditions as needed, and in real time, allowing for improved macro (and/or low lighting) photography.

Exemplary Automatic Continuous Flash Lighting Methods

Figure 4:
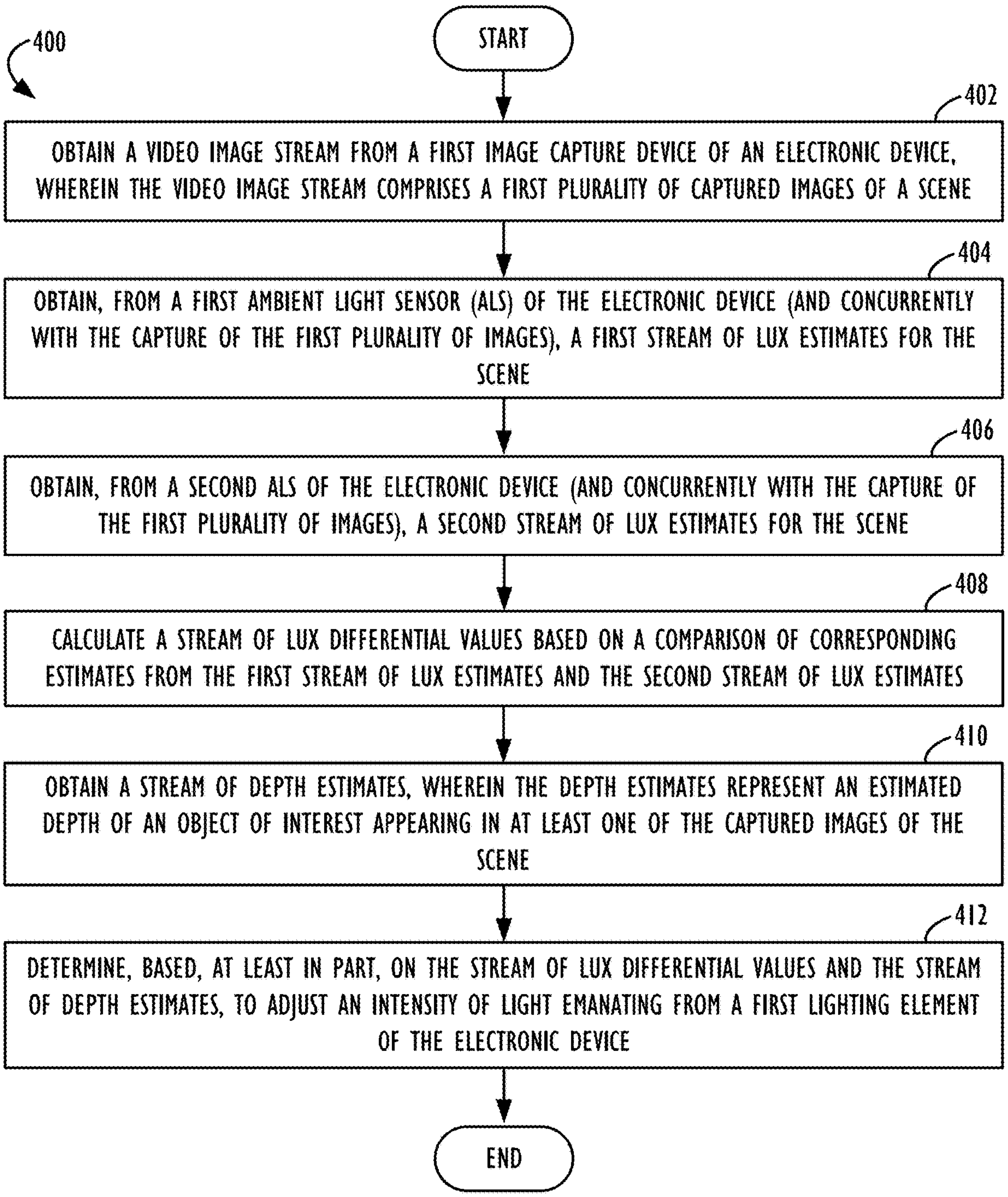
FIG. 4 is a flow chart illustrating a method of performing automatic and continuous flash lighting operations, according to one or more embodiments.

Turning now to FIG. 4, a flow chart illustrating a method 400 of performing automatic and continuous flash lighting by an electronic device is shown, according to one or more embodiments. Method 400 may begin at Step 402 by an electronic device (e.g., a mobile phone comprising an image capture device and two or more ambient light sensors) obtaining a video image stream from a first image capture device of the electronic device. The video image stream includes a first plurality of captured images of a scene.

At Step 404, the method 400 may obtain from a first ambient light sensor (ALS) of the electronic device (and concurrently with the capture of the first plurality of images), a first stream of lux estimates for the scene. At Step 406, the method 400 may obtain, from a second ALS of the electronic device (and concurrently with the capture of the first plurality of images), a second stream of lux estimates for the scene. In accordance with embodiments, Steps 402, 404, and 406 may occur concurrently.

Next, at Step 408, the method 400 may calculate a stream of lux differential values based on a comparison of corresponding estimates from the first stream of lux estimates and the second stream of lux estimates.

Further, at Step 410, the method 400 may obtain a stream of depth estimates, wherein the depth estimates represent an estimated depth of an object of interest appearing in at least one of the captured images of the scene (and/or an estimated depth representative of the overall scene being photographed).

At Step 412, the method 400 may determine, based, at least in part, on the two streams of lux values, the stream of differential lux values, and the stream of depth estimates, to adjust an intensity of light emanating from a first lighting element of the electronic device, e.g., so as to keep a measured scene lux value (or values) within a respective range of acceptable scene lux values. The adjustment may be to the entire first lighting element, or to specific channels that control different areas of the first lighting element e.g., so as to keep a measured channel scene lux value within a respective range of acceptable lux values for the respective channel.

In some embodiments, the lux may be determined using the electronic device, without a separate ALSs. For example, a well calibrated camera may be used to determine that, under all the given settings, how much lux could be considered a digital count of 1. As some electronic devices have front and rear facing cameras, the first scene lux estimate and the second scene lux estimate may be determined from images captured by said cameras. However, using an ALS may have the advantage of not having to read a camera frame to estimate the lux. Such direct measurements using an ALS may require less overall power and a faster response.

In some embodiments, appropriate lighting may be determined without explicitly determining the depth estimates. For example, a weak test glow may be emitted from a lighting device, such as the flash, to determine if there is enough of a response in the acquired image.

In some embodiments, the second ALS may be optional. Embodiments may just increase the lighting from the lighting element up to a predetermined lux threshold. The predetermined lux threshold may be established at a level known to acquire an image with a sufficient signal to noise ratio. However, the use of the second ALS may have the advantage of determining an appropriate lux level for the light to reach with minimal disturbance. For example, the second ALS may be used to make the added light match an ambient light level in the surroundings. Such lighting may prevent the light from being too bright which might be disturbing, or such lighting may be used to indicate that turning on the light will not be disturbing because the ambient light is bright enough.

As another example, when there is a relatively small distance between an image capture device and an object of interest being captured, and a relatively large difference between the streams of lux values coming from opposite sides of the electronic device being used to capture the scene, embodiments may increase the illumination of the sides and/or corner areas of a lighting element, while leaving the center area at a lower illumination.

As previously noted, embodiments may adjust the intensity of light emanating from the first lighting element according to a predefined lighting element activation function. This may help create a calm and subtle feeling that reduces disturbances and photosensitive reactions to sudden changes in illumination. For example, a non-linear curve, such as a curve constructed from one or more increasing exponential functions, may be used as a template for increasing or decreasing the brightness. Such exponential functions may be based on the Weber-Fechner law of human perception of light.

As such, smaller adjustments in brightness will be made in environments with an overall lower level of illumination, while larger adjustments are made in environments with higher levels of illumination. The predefined lighting element activation function may be established in the context of the current supplied to the first lighting element. That is, smaller adjustments are made at lower supply currents, while larger adjustments are made at higher supply currents.

Exemplary Electronic Computing Devices

Figure 5:
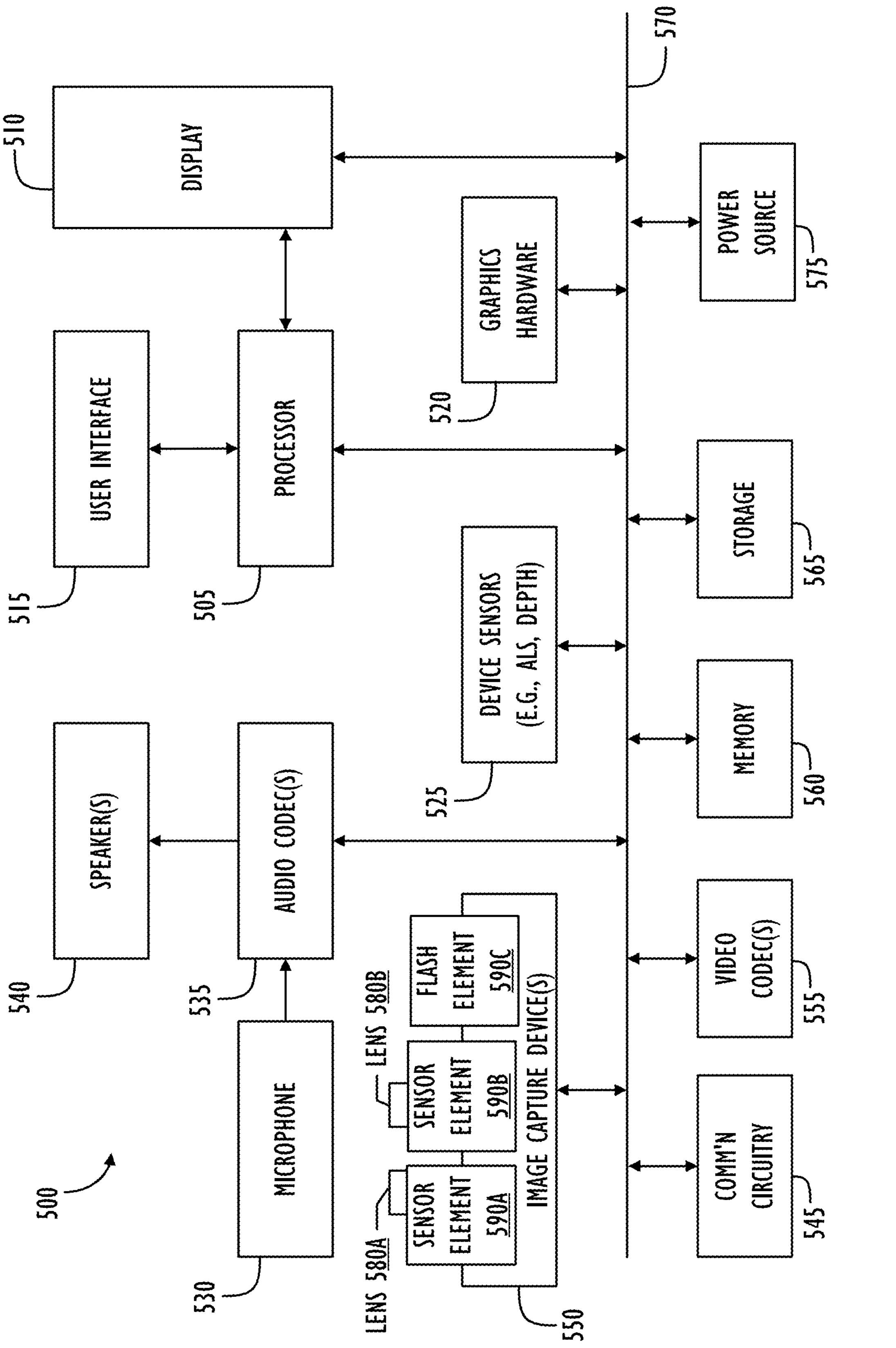
FIG. 5 is a block diagram illustrating a programmable electronic computing device, in which one or more of the techniques disclosed herein may be implemented.

Referring now to FIG. 5, a simplified functional block diagram of illustrative programmable electronic computing device 500 is shown according to one embodiment. Electronic device 500 could be, for example, a mobile telephone, personal media device, portable camera, or a tablet, notebook, or desktop computer system. As shown, electronic device 500 may include processor 505, display 510, user interface 515, graphics hardware 520, device sensors 525 (e.g., proximity sensor/ambient light sensor, depth sensor, accelerometer, inertial measurement unit, and/or gyroscope), microphone 530, audio codec(s) 535, speaker(s) 540, communications circuitry 545, image capture device(s) 550, which may, e.g., comprise multiple camera units/optical image sensors having different characteristics or abilities (e.g., Still Image Stabilization (SIS), high dynamic range (HDR), optical image stabilization (OIS) systems, optical zoom, digital zoom, etc.), video codec(s) 555, memory 560, storage 565, and communications bus 570.

Processor 505 may execute instructions necessary to conduct or control the operation of many functions performed by electronic device 500 (e.g., such as the capture and/or processing of digital video images in accordance with the various embodiments described herein). Processor 505 may, for instance, drive display 510 and receive user input from user interface 515. User interface 515 can take a variety of forms, such as a button, keypad, dial, a click wheel, keyboard, display screen and/or a touch screen. User interface 515 could, for example, be the conduit through which a user may view a captured video stream and/or indicate particular image frame(s) that the user would like to capture (e.g., by clicking on a physical or virtual button at the moment the desired image frame is being displayed on the device's display screen).

In one embodiment, display 510 may display a video stream as it is captured while processor 505 and/or graphics hardware 520 and/or image capture circuitry contemporaneously generate and store the video stream in memory 560 and/or storage 565. Processor 505 may be a system-on-chip (SOC) such as those found in mobile devices and include one or more dedicated graphics processing units (GPUs). Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 perform computational tasks. In one embodiment, graphics hardware 520 may include one or more programmable graphics processing units (GPUs) and/or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device(s) 550 may comprise one or more camera units configured to capture images, e.g., images which may be processed to generate enhanced versions of said captured images, e.g., in accordance with this disclosure. Image capture device(s) 550 may include two (or more) lens assemblies 580A and 580B, where each lens assembly may have a separate focal length (as well as various other different image capture properties, such as capture rate, resolution, etc.). For example, lens assembly 580A may have a shorter focal length relative to the focal length of lens assembly 580B. Each lens assembly may have a separate associated sensor element, e.g., sensor elements 590A/590B. Alternatively, two or more lens assemblies may share a common sensor element. The image capture device (s) 550 may also include a flash element 590C, i.e., a lighting element, in accordance with embodiments herein. One of ordinary skill in the art will appreciate that the flash element 590C may also be separated from the image capture device 550, as a separate component attached to the communications bus 570, in accordance with embodiments herein.

Image capture device(s) 550 may capture still and/or video images. Output from image capture device(s) 550 may be processed, at least in part, by video codec(s) 555 and/or processor 505 and/or graphics hardware 520, and/or a dedicated image processing unit or image signal processor incorporated within image capture device(s) 550. Images so captured may be stored in memory 560 and/or storage 565.

Memory 560 may include one or more different types of media used by processor 505, graphics hardware 520, and image capture device(s) 550 to perform device functions. For example, memory 560 may include memory cache, read-only memory (ROM), and/or random access memory (RAM). Storage 565 may store media (e.g., audio, image, and video files), computer program instructions or software, preference information, device profile information, and any other suitable data. Storage 565 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to retain computer program instructions or code organized into one or more modules and written in any desired computer programming language. When executed by, for example, processor 505, such computer program code may implement one or more of the methods or processes described herein. Power source 575 may comprise a rechargeable battery (e.g., a lithium-ion battery, or the like) or other electrical connection to a power supply, e.g., to a main power source, that is used to manage and/or provide electrical power to the electronic components and associated circuitry of electronic device 500.

Embodiments provide continuous monitoring and controlled illumination in real time for improving image captures. Embodiments further provide a smooth transition of brightness adjustments based on the monitoring. Embodiments also provide a novel segmented flash that controls a spatial distribution of the light emitted from the flash. Embodiments have an advantage that they may be incorporated into existing autofocus procedures in real time. Embodiments may be advantageous in macro photography and visual intelligence use cases, such as QR code scanning or other operations under low light conditions, without disturbing others in the environment.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. An electronic device, comprising:

a memory;

a first image capture device;

a first ambient light sensor (ALS) oriented in a first direction with respect to the electronic device;

a second ALS oriented in a second direction with respect to the electronic device;

a first lighting element configured to emanate light in the first direction; and one or more processors operatively coupled to the memory, wherein the one or more processors are configured to execute instructions causing the one or more processors to:

obtain a video image stream from the first image capture device, wherein the video image stream comprises a first plurality of captured images of a scene;

obtain, from the first ALS and concurrently with the capture of the first plurality of images, a first stream of lux estimates for the scene;

obtain, from the second ALS and concurrently with the capture of the first plurality of images, a second stream of lux estimates for the scene;

calculate a stream of lux differential values based on a comparison of corresponding estimates from the first stream of lux estimates and the second stream of lux estimates;

obtain a stream of depth estimates, wherein the stream of depth estimates represent an estimated depth of an object of interest appearing in at least one of the first plurality of captured images of the scene;

determine, based, at least in part, on the stream of lux differential values and the stream of depth estimates, to adjust an intensity of light emanating from the first lighting element.

2. The electronic device of claim 1, further comprising a display, wherein the display is configured to display an indicator representing a status of the first lighting element.

3. The electronic device of claim 1, further comprising a depth sensor, wherein the stream of depth estimates are determined based, at least in part, on output from the depth sensor.

4. The electronic device of claim 1, wherein the first direction and the second direction are opposite directions from one another with respect to the electronic device.

5. The electronic device of claim 1, wherein the first lighting element comprises a plurality of controllable channels.

6. The electronic device of claim 5, wherein the instructions causing the one or more processors to adjust an intensity of light emanating from the first lighting element further comprise instructions causing the one or more processors to:

adjust an intensity of each of the plurality of controllable channels until a corresponding measured scene lux value for each channel is within a respective range of acceptable lux values for the channel.

7. The electronic device of claim 1, wherein the instructions causing the one or more processors to adjust an intensity of light emanating from the first lighting element further comprise instructions causing the one or more processors to:

activate the first lighting element when: (a) values in the stream of lux differential values meet a lux differential criterion; and (b) corresponding values in the stream of depth estimates meet a depth criterion.

8. The electronic device of claim 7, wherein the lux differential criterion comprises an estimate from the second stream of lux estimates being greater than the corresponding estimate from the first stream of lux estimates by more than a lux differential threshold amount.

9. The electronic device of claim 7, wherein the depth criterion comprises the estimated depth of the object of interest being less than a first depth threshold amount.

10. The electronic device of claim 1, wherein the instructions causing the one or more processors to adjust an intensity of light emanating from the first lighting element further comprise instructions causing the one or more processors to:

deactivate the first lighting element when: (a) values in the stream of lux differential values do not meet a lux differential criterion; or (b) values in the stream of depth estimates do not meet a depth criterion.

11. The electronic device of claim 1, wherein the instructions causing the one or more processors to adjust an intensity of light emanating from the first lighting element further comprise instructions causing the one or more processors to:

adjust an intensity of light emanating from the first lighting element according to a predefined lighting element activation function.

12. The electronic device of claim 1, wherein the instructions causing the one or more processors to adjust an intensity of light emanating from the first lighting element further comprise instructions causing the one or more processors to:

activate the first lighting element when either the first stream of lux estimates or the second stream of lux estimates is below a predetermined threshold value.

13. The electronic device of claim 1, wherein the instructions causing the one or more processors to adjust an intensity of light emanating from the first lighting element further comprise instructions causing the one or more processors to:

adjust an intensity of light emanating from the first lighting element until an estimated lux value from the second stream of lux estimates is within a range of acceptable scene lux values.

14. A digital image processing method, comprising:

obtaining a video image stream from a first image capture device of an electronic device, wherein the video image stream comprises a first plurality of captured images of a scene;

obtaining concurrently with the capture of the first plurality of images, a first stream of lux estimates for the scene in a first direction;

obtaining concurrently with the capture of the first plurality of images, a second stream of lux estimates for the scene in a second direction, wherein the first direction and the second direction are opposite directions from one another with respect to the electronic device;

calculating a stream of lux differential values based on a comparison of corresponding estimates from the first stream of lux estimates and the second stream of lux estimates;

determining, based, at least in part, on the stream of lux differential values, to adjust an intensity of light emanating from a first lighting element in communication with the electronic device.

15. The digital image processing method of claim 14, further comprising:

obtaining a depth estimate, wherein the depth estimate represents an estimated depth of an object of interest appearing in at least one of the first plurality of captured images of the scene, and wherein determining to adjust the intensity of light is based in part on the depth estimates.

16. The digital image processing method of claim 15, wherein the depth estimate is part of a stream of depth estimates of the object of interest.

17. The digital image processing method of claim 14, wherein the first stream of lux estimates is determined from the first plurality of images.

18. The digital image processing method of claim 14, wherein the first lighting element is part of the electronic device.

19. A non-transitory computer readable medium comprising computer readable instructions stored thereon, wherein the computer readable instructions are executable by one or more processors to:

obtain a video image stream from a first image capture device of an electronic device, wherein the video image stream comprises a first plurality of captured images of a scene;

obtain concurrently with the capture of the first plurality of images, a first stream of lux estimates for the scene;

obtain a stream of depth estimates, wherein the stream of depth estimates represent an estimated depth of an object of interest appearing in at least one of the first plurality of captured images of the scene;

determine, based, at least in part, on the first stream of lux estimates and the stream of depth estimates, to adjust an intensity of light emanating from a first lighting element of the electronic device.

20. The non-transitory computer readable medium of claim 19, further comprising computer readable instructions to:

obtain concurrently with the capture of the first plurality of images, a second stream of lux estimates for the scene; and calculate a stream of lux differential values based on a comparison of corresponding estimates from the first stream of lux estimates and the second stream of lux estimates, wherein determining to adjust the intensity of light is further based in part on the stream of lux differential values.

* * * * *